Aug. 26, 1947.                S. W. ALDERFER                 2,426,572
           APPARATUS FOR SPREADING VISCOUS OR PLASTIC MATERIALS
                           Filed Oct. 2, 1944
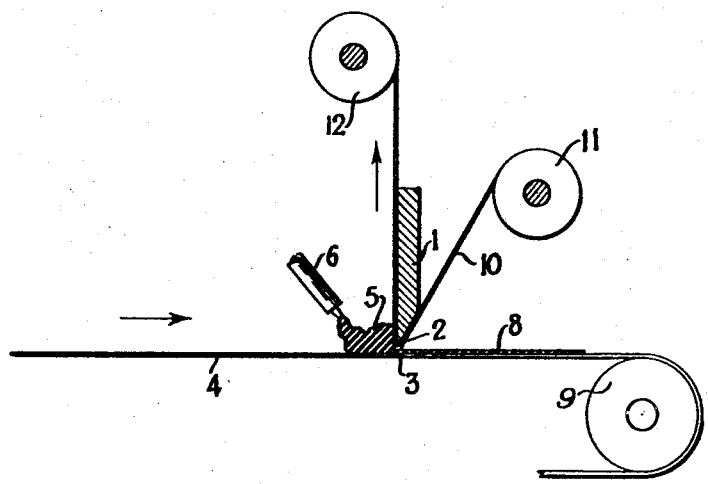
Inventor
STERLING W. ALDERFER Patented Aug. 26, 1947

2,426,572

UNITED STATES PATENT OFFICE 2,426,572

APPARATUS FOR SPREADING VISCOUS OR PLASTIC MATERIALS

Sterling W. Alderfer, Akron, Ohio, assignor to Andrews-Alderfer Processing Company Incorporated, Akron, Ohio, a corporation of Ohio Application October 2, 1944, Serial No. 556,863

8 Claims. (Cl. 91—53)

1

The present invention has as its object the provision of an apparatus for improving the operation of spreading dispersions of rubber or rubber-like substances and viscous and plastic materials, either for coating webs or fabrics or for the production of films or sheets of such materials. The invention consists in an improvement applied to the usual spreader blade or "doctor" which will insure the formation of smooth, even layers of the spread material. While the invention is particularly intended for use in spreading natural or artificial dispersions of rubber or rubber-like materials, it is also useful in the making of fine layers of other materials which have similar physical properties and may be spread in like manner.

The invention is particularly useful where very thin layers or coatings of accurate gauge are desired. It often happens that in dispersions of the character described, small lumps or particles of the dispersed or viscous material may be encountered even though the greatest care is exercised in the preparation of the material. Oftentimes lumps or particles will form in the material after it has been prepared or in the bank which builds up behind the blade. Also small particles of dirt or grit may be caught in the material. In using an ordinary spreader blade or doctor, these lumps or particles will tend to collect at the pass beneath the blade and adhere to the blade. This will create uneven streaks in the material as it passes under the blade and it is necessary to clean the edge of the blade periodically. This, of course, necessitates stopping the operation and removing the bank of material which has accumulated at the back of the blade.

The present invention has as its object the provision of means which will continuously remove such particles or lumps as may tend to be caught on the edge of the blade. Specifically, it consists in the provision of a slowly moving web which travels around the blade, to which web any solid lumps or particles will adhere and be carried by the movement of the web away from the pass at the edge of the blade.

The invention has many fields of utility and is not limited to the spreading of rubber or rubber-like dispersions. It may be employed either in the application of coatings or the making of sheets of the material. It is particularly useful where very thin, fine coatings or sheets are to be produced, in which operation uniformity of thickness or gauge is especially desirable, for in such cases even a minute particle of the material or any foreign substance such as grit or dirt will

2 cause thin spots or streaks to be found which spoil the finished product.

The single figure of the drawing shows, in somewhat diagrammatic form, one embodiment of the invention, but it will be understood that this is merely exemplary and intended as an illustration of the invention and not as limiting the scope thereof.

In the drawing, 1 represents any standard form of spreader blade or doctor such as employed in the spreading of plastic or viscous materials. This type of device is ordinarily brought down to a relatively sharp edge 2 which forms one side of the pass 3 which gauges and determines the thickness of the material. Usually the spreader blade is adjustable to regulate the thickness of the finished layer or sheet.

4 represents a moving body or backing on which the material is spread. This may either be a fabric or web to which a layer of the material is to be permanently joined, or it may be a belt from which the layer of material is to be stripped after it has been solidified by drying, setting or curing.

The material to be spread collects as a mass or bank on the back or incoming side of the blade 1, such a mass being indicated at 5. It may be continuously supplied to the bank as by a spout 6 or the bank may be replenished intermittently.

The supporting web moves forwardly in the direction of the arrow and the material is drawn thereby beneath the blade and forms as a sheet or layer 8 on the far side thereof. Any suitable means may be provided for moving the body or backing relatively to the spreading device, such a means being exemplified by the pulley 9. Any lumps or particles of foreign material which may be in the mass will be carried to the pass 5 and will, in prior devices of this type, stick to the edge of the blade where they form objectionable obstructions to the uniform flow of the material. In order to remove these particles immediately so that they will not injure the web or cause uneven streaks therein, a thin sheet 10 of a suitable material is continuously or intermittently passed around the edge of the blade in the direction opposite to the travel of the material. Any lumps or particles which reach the pass will cling to ths sheet instead of to the blade and be carried upwardly out of the mass. It is preferred that the sheet 10 be moved continuously, but at a relatively slow speed, from the supply roll 11 to the wind-up roll 12. The sheet 10, therefore, constitutes a cleaning or scavenging medium which collects objectionable solid masses or particles and removes them from the spreading zone at the pass 3. It will be seen that the spreading edge is, in reality, formed by the sheet 10 backed up by the edge of the spreading blade or doctor.

As the web or sheet 10 moves upwardly from the pass, the material which may temporarily cling to the sheet 10 will fall back by gravity into the mass 5, while the foreign particles or lumps will adhere to the sheet and be carried to the wind-up roll 12.

There are several essentials which should be observed in the selection of the cleaning or scavenging sheet 10. It should be thin and flexible for it should cling to the edge of the blade and follow its contour. For this purpose any of the numerous plastic sheetings which have been more recently developed may be employed. Such materials made from synthetic resins are well known in the arts. Usually they are composed of copolymers of vinyl compounds, rubber chlorides or regenerated cellulose and are sold under a variety of trade names. Many of these materials are obtainable in sheets of uniform thickness of .001 or .002 of an inch. The material should have sufficient tensile strength to resist the strain which may be imposed upon it. It should also be inert to or unaffected by the material to be spread. If water dispersions are to be spread, the material should be insoluble in water.

The speed at which the sheet of scavenging material should be moved is dependent upon the character of the work to be done, the speed at which the backing 4 is moved and the rate at which particles tend to collect at the pass. In the spreading of artificial water dispersions of rubber, the backing has been propelled at the rate of 10 to 20 feet per minute and the scavenging web has been moved over the spreading blade at the rate of 1 to 2 inches per minute. In such a case the pass between the edge of the blade, or rather the surface of the sheet 10, and the backing has been set at .016 of an inch and uniformly perfect layers of the rubber have been produced. Such a material will usually dry and set at approximately .008 of an inch, so that it will be seen that any lump or particle which might otherwise be trapped on the edge of the blade would seriously affect the finished product. The details which have been given are not to be taken as limiting the invention, but merely as illustrative of its use.

It will be seen that there has been provided a new and improved device which is extremely useful in the manufacture of sheets or coatings from spreadable materials. Uniform thickness of the product is especially desirable if the product is very thin and delicate where flaws in the resultant sheet or web would render the product useless. The process has been found to have great utility in the formation of thin webs of rubber which are slit into fine threads and its success in this field has led to a wider scope for the invention.

While the usual practice is to provide a stationary blade and a movable backing, the movement may be relative only, i. e., the blade may be moved over a stationary table or backing.

What is claimed is:

1. In a device for spreading materials of the type specified, the combination of a spreader blade to retain and hold a mass of the material, a moving backing spaced from the blade, and a flexible sheet movable around the edge of the blade.

2. In a device for spreading materials of the type specified, the combination of a spreader blade to retain and hold a mass of the material, a moving backing spaced from the blade, and a flexible sheet movable around the edge of the blade in a direction opposite to the movement of the backing.

3. In a device for spreading materials of the type specified, the combination of a spreader to retain and hold a mass of the material, a backing spaced from the spreader and movable relative thereto, and a film movable through the space between the spreader and the backing and adapted to clear the space of any obstructions which lodge therein.

4. In a device for spreading materials of the type specified, the combination of a spreader to retain and hold a mass of the material, a backing spaced from the spreader and movable relative thereto, and a film movable in the opposite direction through the space between the spreader and the backing and adapted to clear the space of any obstructions which lodge therein.

5. In a device for spreading rubber, rubber-like dispersions or similar spreadable materials, a longitudinally moving backing and a stationary spreader blade, said elements being spaced to provide a pass through which a layer of the material will be drawn by the movement of the backing, and a thin flexible sheet passing around the edge of the blade at the pass, said sheet being movable in the direction opposite to the movement of the backing.

6. In a spreading apparatus for forming layers or coatings from a mass of rubber, rubber-like dispersions or similar spreadable materials, the combination of a spreader blade and a spaced backing means for moving the backing and the blade relatively to one another, and means operative during the spreading operation to remove solid particles which may be caught in the space between the backing and the blade.

7. In a spreading apparatus for forming layers or coatings from a mass of rubber, rubber-like dispersions or similar spreadable materials, the combination of a spreader blade and a spaced backing means for moving the backing and the blade relatively to one another, and means movable through the space between the blade and the backing to collect and retain solid particles which have lodged in the space.

8. In a spreading apparatus for forming layers or coatings from a mass of rubber, rubber-like dispersions or similar spreadable materials, the combination of a spreader blade and a spaced backing means for moving the backing and the blade relatively to one another, and a sheet movable through the space between the blade and the backing material, said sheet being adapted to collect and retain solid particles which have been carried to the space.

STERLING W. ALDERFER.

REFERENCES CITED

The following references are of record in the file of this patent:

UNITED STATES PATENTS

| Number | Name | Date |
|---|---|---|
| 1,184,452 | Hopewell | May 23, 1916 |
| 2,360,037 | Bouget | Oct. 10, 1944 |